United States Patent
de Arriz et al.

(10) Patent No.: US 11,293,574 B2
(45) Date of Patent: Apr. 5, 2022

(54) COUPLING

(71) Applicant: Dixon Valve & Coupling Company, LLC, Chestertown, MD (US)

(72) Inventors: Maximilian de Arriz, Chestertown, MD (US); Tony Benjamin Reed, Chestertown, MD (US); Lucas Barmoy, Salisbury, MD (US)

(73) Assignee: Dixon Valve & Coupling Company, LLC, Chestertown, MD (US)

( * ) Notice: Subject to any disclaimer, the term of this patent is extended or adjusted under 35 U.S.C. 154(b) by 11 days.

(21) Appl. No.: 16/996,029

(22) Filed: Aug. 18, 2020

(65) Prior Publication Data

US 2021/0054958 A1   Feb. 25, 2021

Related U.S. Application Data

(60) Provisional application No. 62/688,494, filed on Aug. 20, 2019.

(51) Int. Cl.
*F16L 37/18*       (2006.01)

(52) U.S. Cl.
CPC .................. *F16L 37/18* (2013.01)

(58) Field of Classification Search
CPC ....... F16L 37/18; F16L 37/096; F16L 37/127; F16L 37/20; F16L 2201/20; F16L 35/00
See application file for complete search history.

(56) References Cited

U.S. PATENT DOCUMENTS

| 3,124,374 A | 3/1964 | Krapp |
| 3,314,698 A | 4/1967 | Owens |
| 4,295,670 A | 10/1981 | Goodall et al. |

(Continued)

FOREIGN PATENT DOCUMENTS

| DE | 3222937 A1 * | 12/1983 | ............. F16L 37/18 |
| EP | 0104819 A2 * | 4/1984 | ............. F16L 37/18 |

(Continued)

OTHER PUBLICATIONS

P. Schwindt et al., Tech Transfer—NASA's Kennedy Space Center Innovative Partnerships, New Technology Report, "Cam-and-Groove Hose Coupling Halves Safety Modification", vol. 4, No. 1, p. 3, 2011 (month unknown).

*Primary Examiner* — Matthew Troutman
*Assistant Examiner* — James A Linford
(74) *Attorney, Agent, or Firm* — Howson & Howson LLP

(57) ABSTRACT

A coupler assembly is provided that includes an adapter body, a coupler body, and a sealing gasket. The adapter body has a sidewall with a circumferential groove in an outer periphery thereof, the coupler body has a sidewall defining an adapter-receiving socket therein, and the sealing ring is housed within the coupler body and captured between an end wall flange of the coupler body at a base of the adapter-receiving socket and a radially inward extending gasket retaining lip of the coupler body spaced from the end wall flange. At least one cam arm and at least one safety-release tab are connected to the sidewall of the coupler body, and at least one vent channel is formed in the sidewall of the coupler body within the adapter-receiving socket and extends from the end wall flange to beyond the gasket retaining lip of the coupler body adjacent an outer periphery of the sealing ring.

13 Claims, 7 Drawing Sheets

(56) References Cited

U.S. PATENT DOCUMENTS

| | | | |
|---|---|---|---|
| 4,647,075 A | 3/1987 | Margo | |
| 4,802,694 A | 2/1989 | Vargo | |
| 5,042,850 A | 8/1991 | Culler | |
| 5,338,069 A * | 8/1994 | McCarthy | F16L 37/18 |
| | | | 285/312 |
| 6,047,995 A | 4/2000 | Kotake | |
| 7,354,077 B1 * | 4/2008 | Jumonville | F16L 37/18 |
| | | | 285/312 |
| 8,235,425 B2 | 8/2012 | Eich | |
| 9,347,593 B2 | 5/2016 | Wawchuk | |
| 9,562,639 B1 | 2/2017 | Hartman et al. | |
| 9,695,968 B1 | 7/2017 | Hartman et al. | |
| 9,732,894 B1 | 8/2017 | Hartman et al. | |
| 10,274,119 B2 | 4/2019 | Hartman et al. | |
| 10,295,098 B2 | 5/2019 | Hartman et al. | |
| 10,295,099 B2 | 5/2019 | Hartman et al. | |
| 10,400,930 B2 | 9/2019 | Micken et al. | |
| 2016/0245442 A1 | 8/2016 | Micken et al. | |
| 2016/0298799 A1 * | 10/2016 | Lee | F16L 37/18 |

FOREIGN PATENT DOCUMENTS

| | | | | |
|---|---|---|---|---|
| EP | 1211186 A2 * | 6/2002 | | F16L 55/11 |
| GB | 2211258 A | 6/1989 | | |
| JP | 2017115949 A * | 6/2017 | | F16L 37/096 |
| WO | WO-2009137320 A1 * | 11/2009 | | F16L 37/18 |
| WO | 2011/139152 A1 | 11/2011 | | |

\* cited by examiner

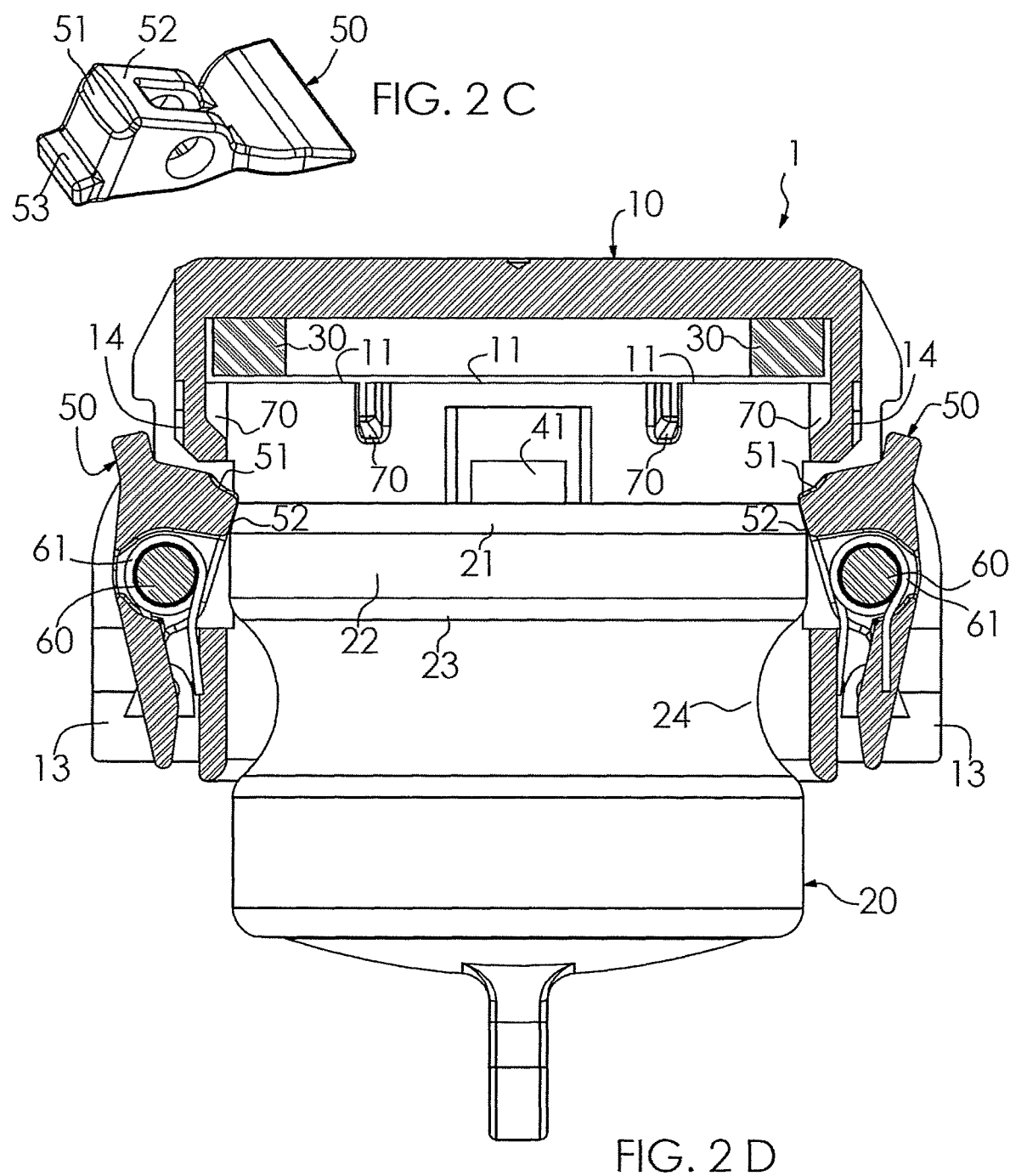

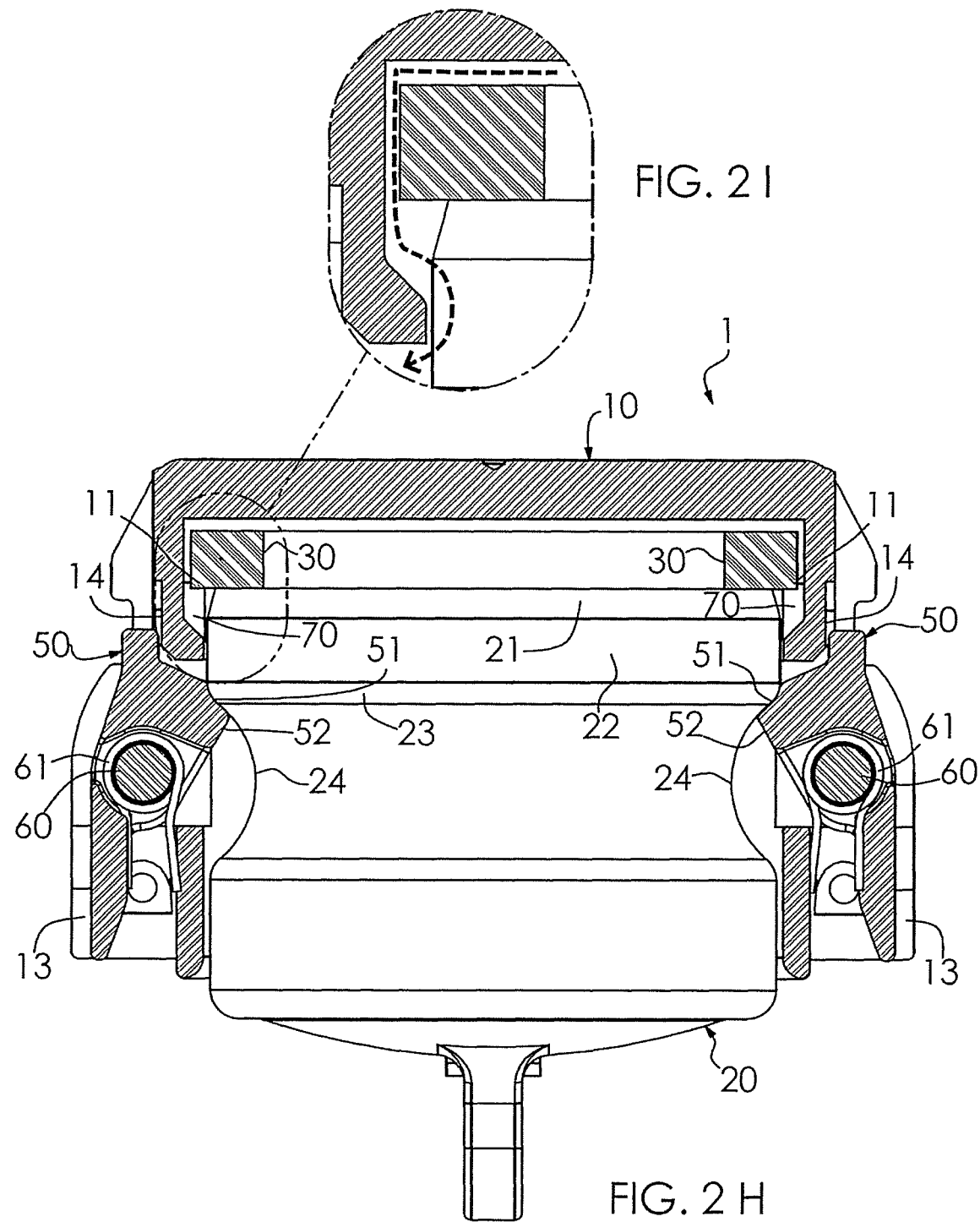

COUPLING

CROSS REFERENCE TO RELATED APPLICATIONS

This application claims the benefit under 35 USC § 119(e) of U.S. Provisional Patent Application No. 62/889,424 filed Aug. 20, 2019.

BACKGROUND

This disclosure relates to the field of couplings for hoses, pipes, and the like, in particular, quick-disconnect cam-and-groove couplings enabling fluid transfer.

SUMMARY

A coupler assembly is provided and includes an adapter body, a coupler body, a sealing ring, at least one cam arm, at least one safety-release tab, and at least one vent channel. The adapter body has a sidewall extending between opposite open ends and a circumferential groove in an outer periphery of the sidewall. The coupler body has a sidewall defining an adapter-receiving socket therein between opposite open ends. The sealing ring is housed within the coupler body and is captured between an end wall flange of the coupler body at a base of the adapter-receiving socket and a radially inward extending gasket retaining lip of the coupler body spaced from the end wall flange. The at least one cam arm is connected to the sidewall of the coupler body and is able to pivot relative to the coupler body from an unlocking position in which a camming surface of the cam arm is pivoted out of the adapter-receiving socket and a locking position in which the camming surface of the cam arm is pivoted into the adapter-receiving socket through an opening in the sidewall of the coupler body for engagement with the circumferential groove of the adapter body for locking the adapter body within the coupler body in a condition in which a fluid-tight seal is formed by the sealing ring between the adapter body and the coupler body. The at least one safety-release tab is connected to the sidewall of the coupler body such that the at least one safety-release tab is resiliently pivoted relative to the coupler body between a normal position that prevents release of the adapter body from the coupler body and a release position that permits release of the adapter body from the coupler body. The at least one vent channel is formed in the sidewall of the coupler body within the adapter-receiving socket and extends from the end wall flange to beyond the gasket retaining lip of the coupler body adjacent an outer periphery of the sealing ring.

DETAILED DESCRIPTION

Figure 1:
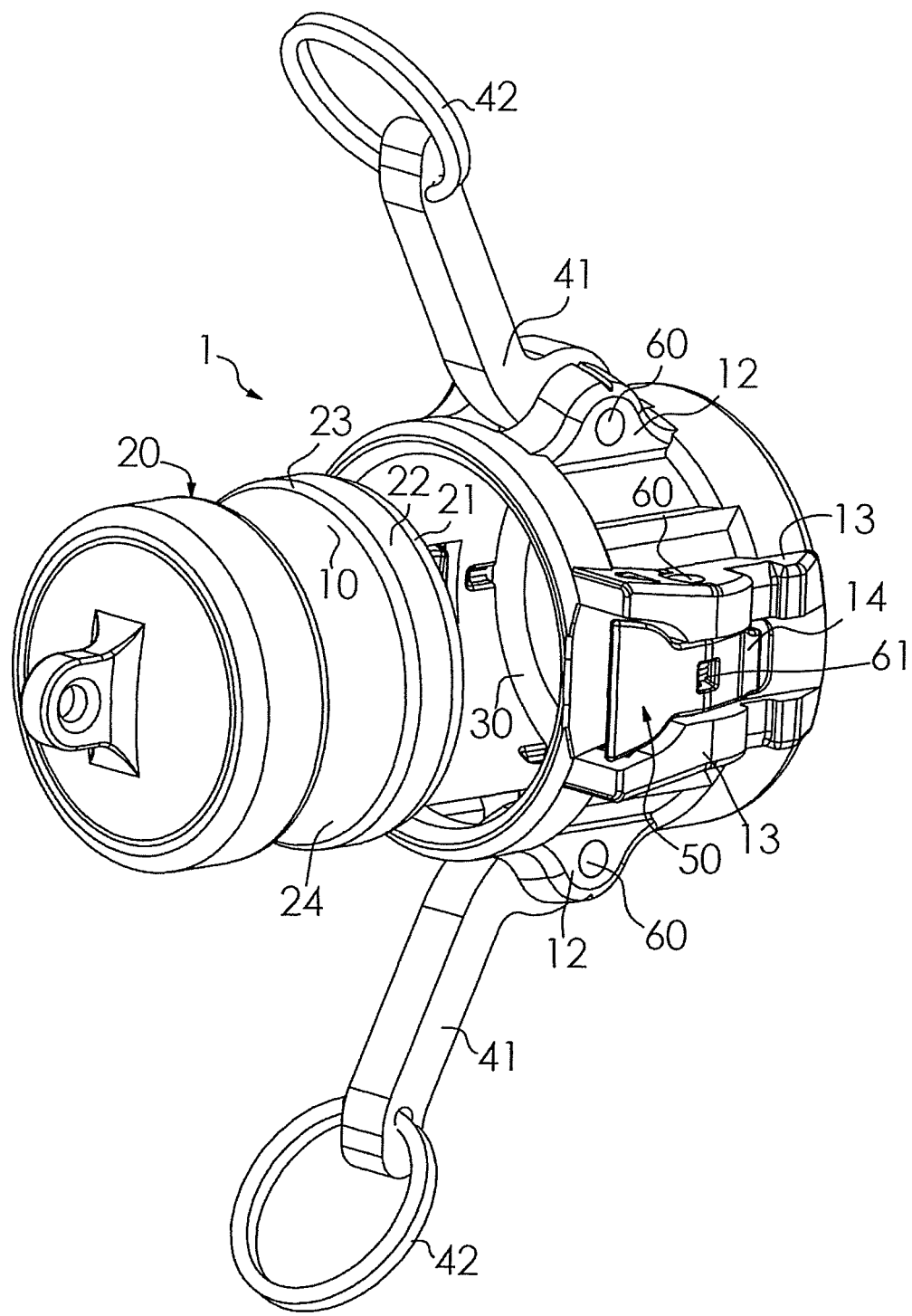
FIG. 1 is a perspective view of a disconnected coupler assembly in accordance with an embodiment.

A coupling assembly 1 in an uncoupled condition is shown in FIG. 1. The coupling assembly 1 provides a cam-and groove coupling that includes an adapter body 20, a coupler body 10, and a sealing ring or gasket 30 able to form a fluid-tight seal therebetween. Each of the adapter body 20 and coupler body 10 has an end that may be secured to a hose, conduit, pipe, or other vessel defining a path through which a fluid may be transferred or flowed. The coupling assembly 1 disclosed herein enables quick connection and disconnection of the assembly and, in addition, provides a safety-release mechanism in case pressure remains within the coupling assembly 1 at the time of disconnection.

Accordingly, the hollow and generally cylindrical adapter body 20 has a single outer circumferential groove 24 in an outer wall surface 22 thereof and is of a size that is receivable within the hollow coupler body 10. In a coupled condition, the sealing ring 30 is compressed between an end or free face of the adapter body 20 and an end wall flange of the coupler body 10 to form a fluid-tight seal within the coupling assembly 1. For instance, see FIG. 2G. For this purpose, the coupler body 10 includes an opposed pair of cam arms 41 having inwardly directed camming surfaces, or cams, which can be rotated within the groove 24 of the adapter body 20 to tightly secure the adapter body 10 within the coupler body 10 placing the sealing ring 30 in the compressed seal-forming condition. While a pair of cam arms 41 are illustrated, one or more than two cam arms 41 can be provided on the coupler body 10.

According to embodiments disclosed herein, the coupler body 10 also includes an opposed pair of resiliently biased safety-release tabs 50 that are offset and separate from the cam arms 41. While a pair of tabs 50 are illustrated, one or more than two tabs 50 can be provided on the coupler body 10.

Figure 2:
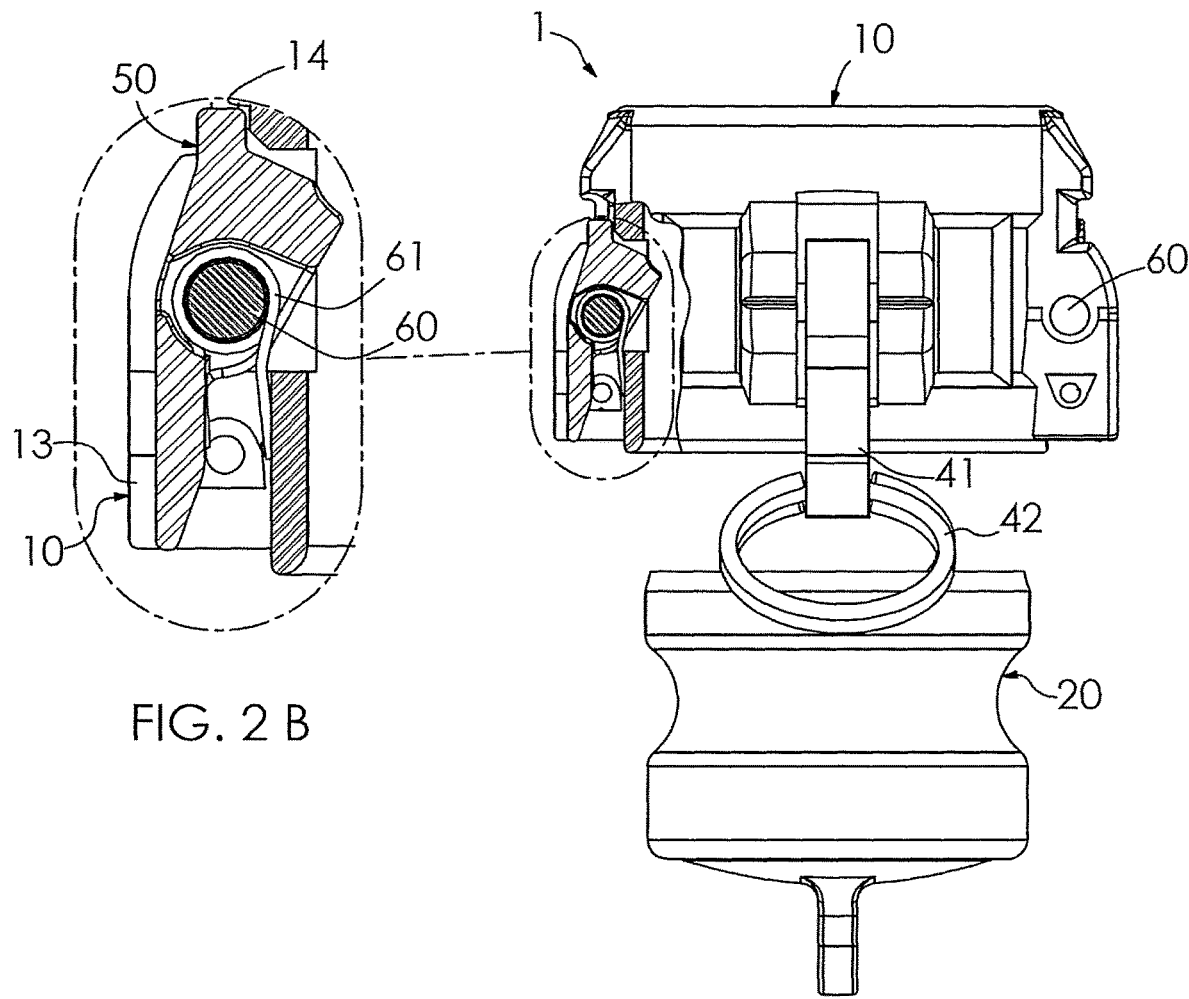
FIG. 2A is a partially cut-away elevational view of the coupler assembly of FIG. 1.
FIG. 2B is a magnified view of the cut-away section of FIG. 2A.
FIG. 2C is a perspective view of the venting safety tab shown in FIG. 2B.
FIG. 2D is a cross-sectional view of an adapter body partially inserted into a coupler body of the coupler assembly of FIG. 1.
FIG. 2E is a cross-sectional view of the adapter body further inserted into the coupler body of the coupler assembly relative to the position shown in FIG. 2D.
FIG. 2F is a cross-sectional view of the adapter body further inserted into the coupler body of the coupler assembly relative to the position shown in FIG. 2E.
FIG. 2G is a cross-sectional view of the adapter body past a safety-release venting position (shown in FIG. 2H) and demonstrating the adapter body in the assembly in functional working capacity.
FIG. 2H is a cross-sectional view of the adapter body in the safety-release venting position within the coupler body of the coupler assembly of FIG. 1.
FIG. 2I is a magnified view of a portion of the cross-sectional view of the adapter body in the safety-release venting position. There is a thick dashed arrow simulating the path traveled by vented fluid.
Figure 2:
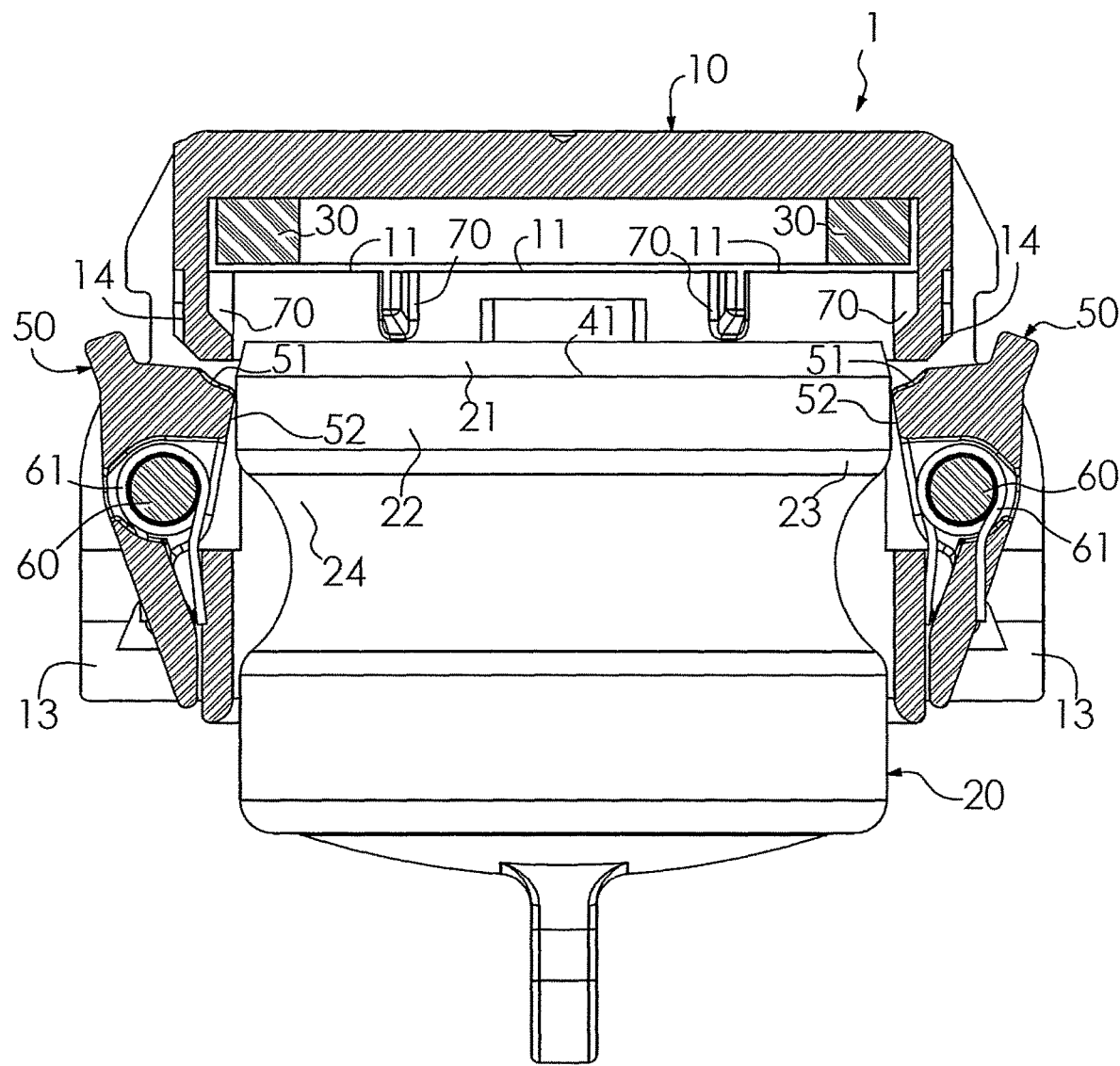
Figure 2:
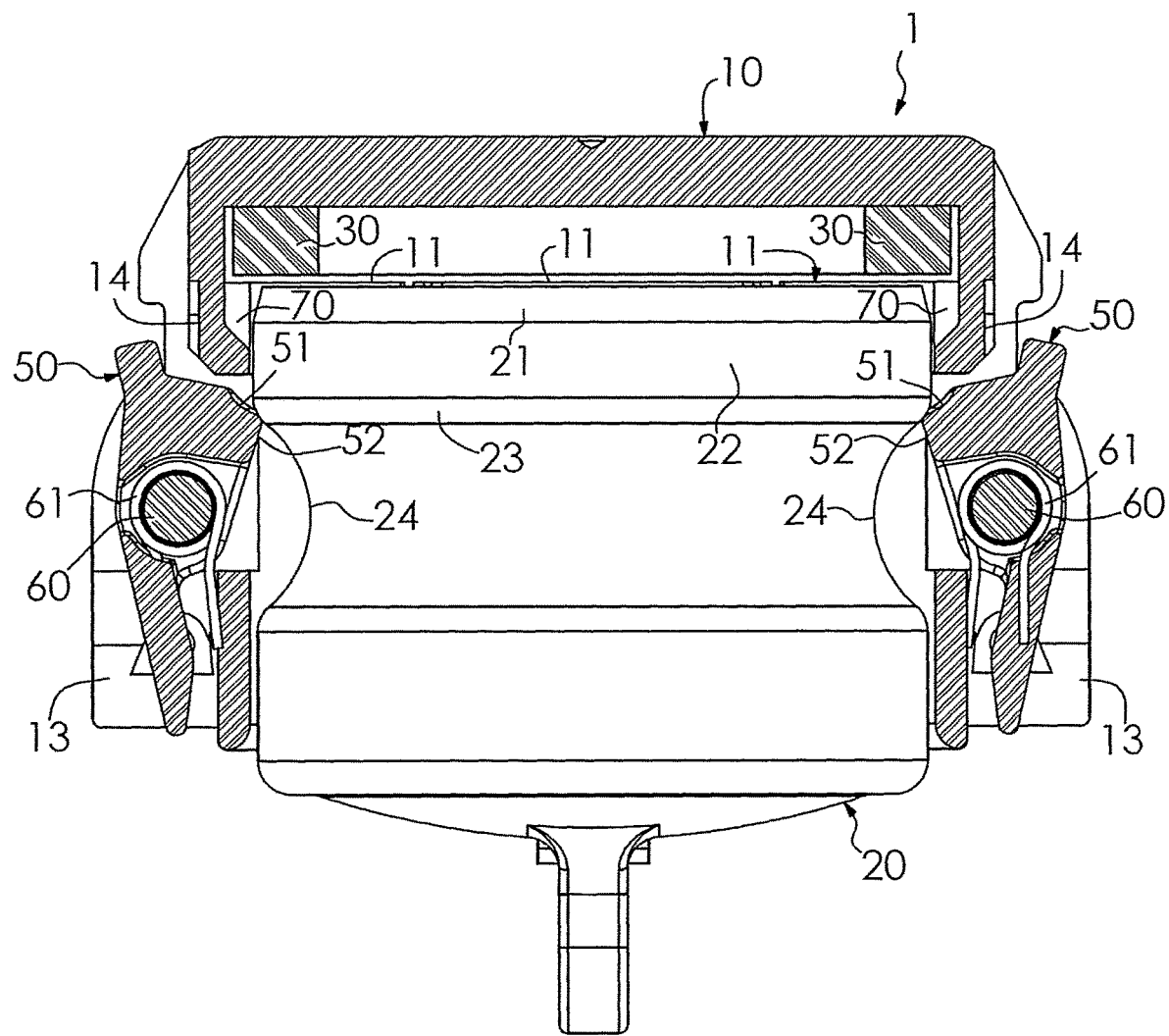
Figure 2G:
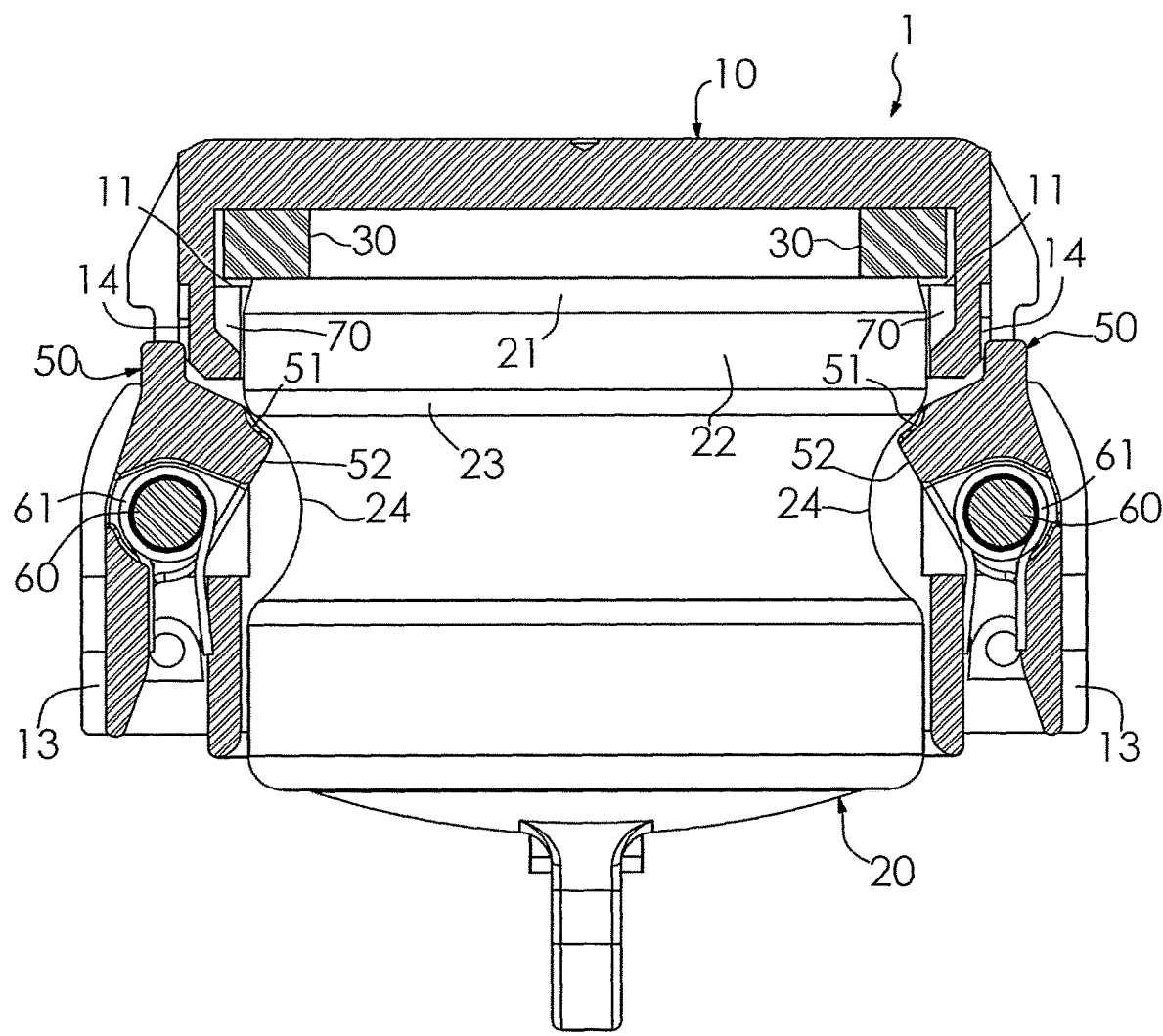

When the adapter body 20 is initially inserted into the coupler body 10, the tabs 50 are forced to pivot about the cylindrical body of the pin 60 and deflect outwardly thereby freely permitting passage of the adapter body 20 (for instance, see FIGS. 2D and 2E) and, when the adapter body 10 is released from the cams of the cam arms 41 within the coupling body 10 with pressure remaining in the line, the tabs 50 engage an edge of the circumferential groove 24 of the adapter body 20 to prevent the adapter body 20 from passage beyond the tabs 50 and release out of the coupler body 10 (for instance, see FIG. 2H).

The tabs 50 are located at a position on the coupler body 10 that permits the adapter body 20 to slide within the coupler body 10 to a position such that the adapter body 20 no longer forms a seal with the coupler body 10 via the sealing ring 30 and to thereby provide a small gap forming a safety vent path to safely release any pressure within the coupling without the adapter body 20 being completely separated from the coupling body 10. For instance, see FIG. 2I which results when the pressure within the line forces the sealing ring 30 against the lip 11 and the leading end of the adapter body 20.

The adapter body 20, which is shown in the form of a plug in the illustrated embodiment, but which can have an open end secured to a hose or like conduit discussed above, is hollow and has a relatively cylindrical outer wall surface 22. The circumferential groove 24 is formed in a generally medial portion of the outer wall surface 22 at a spaced distance from the leading or free end 21 of the adapter body 20 which is adapted to engage the sealing ring 30. A rear radius 23 is formed in the adapter body 22 and transitions the groove 24 into the outer wall surface 22 adjacent the leading end 21 of the adapter plug 20. The rear radius 23 forms an edge of the groove 24.

The coupler body 10 is also hollow and includes an inner peripheral wall that defines a socket in which the adapter body 20 may be inserted and an outer peripheral wall in which an opposed pair of cam arms 41 having rings 42 and an opposed pair of safety release tabs 50 are secured. For instance, each cam arm 41 is secured to the coupler body 10 between a pair of cam ears 12 through which a pin 60 is extended thereby permitting the cam arms 41 to be manually pivoted relative to the coupler body 10 between a locking position in which camming surfaces (not shown) of the cam arms 41 extend within the groove 24 to engage the adapter body 20 and an unlock position in which the camming surface do not extend with the groove 24 of the adapter body 20. Each tab 50 is mounted to the coupler body 10 between a pair of tab ears 13 with a pin 60 permitting the tabs to pivot thereabout.

The sealing ring 30 is positioned within the coupler body 10 between an end wall flange of the coupler body 10 and a gasket retaining lip 11 at the base of the adapter-receiving socket within the coupler body 10. Although the end wall of the coupler body 20 is shown as being closed, it would have an opening for connection to a hose or the like. When the cam arms 41 are in the locked position and the cams thereof extend within the groove 24 of the adapter body 20, the adapter body 20 is locked within the coupler body 10 and forms a fluid tight seal therewith via the sealing ring 30 being compressed therebetween. When the cam arms 41 are pivoted such that the cams are withdrawn from the groove 24 of the adapter body 20, this permits the adapter body 20 to slide out of engagement with the sealing ring 30 and releases the seal. If there is pressure in the system upon release of the adapter body 20 from the cams of the cam arms 41, the sealing ring 30 is forced toward and against the gasket retaining lip 11 thereby permitting venting of pressure about the outside of the sealing ring 30 via vent channels 70 formed in the inner wall of the coupler body 10. For instance, see FIGS. 2H and 2I.

When initially forming a coupling, the coupling body 10 and adapter body 20 are in the position shown in FIG. 2A with the adapter body 20 being in position for insertion within the coupling body 10. In this condition, the cam arms 41 are pivoted outwardly away from the coupling body 10 to remove the cams from blocking the path of the adapter body 20. In addition, the tabs 50 are in a normal spring-biased position as shown in FIG. 2B. A spring 61, such as a torsion spring, forces a tab locking face 53 of the tab 50 against a tab locking face 14 of the coupler body 10. This is the normal position of the tab 50 under the force of the spring 61. In this position, the tab working face 51 and the tab passive slide face 52 extend within the coupler body 10 within the path of the adapter body 20. The configuration of the tab 50 and the faces thereof discussed above are best shown in FIG. 2C.

Upon further advancement of the adapter body 20 into the coupler body 10, the leading edge 21 of the adapter body 20 will engage the passive slide faces 52 of each of the opposed tabs 50. See FIG. 2D. This sliding engagement between these surfaces will cause the tabs 50 to pivot outwardly about the pins 60 against the force of the springs 61 to permit passage of the adapter body 20 beyond the tabs 50. See FIG. 2E.

When the location of the rear radius 23 of the groove 24 of the adapter body 20 reaches the working faces 51 of the tabs 50, the tabs 50 are pivoted inward due to the force of the springs 61. See FIGS. 2F and 2G. In the position shown in FIG. 2G, the adapter body 20 may be inserted to a position in engagement with the sealing ring 30 and the cam arms 41 may be pivoted such that the cams extend within the groove 24 of the adapter body 20 and tightly secure the adapter body 20 to the coupling body 10 with a fluid-tight seal being formed therebetween with compression of the sealing ring 30.

Upon withdraw of the adapter body 20 out of the coupler body 10, the cam arms 41 may be pivoted outward to withdraw the cams from the groove 24 of the adapter body 20. In the event pressure remains within the system, which may otherwise cause the adapter body 20 to be undesirably blown out of the coupler body 10, the rear radius 23 of the groove 24 of the adapter body 20 will come into engagement with the working faces 51 of the tabs 50. For instance, see FIG. 2H. In this resting position, the adapter body 20 remains captured within the coupler body 10 and a venting path is created to permit pressure within the coupling and line to safely vent and be released from the coupling. For instance, the pressure can vent around the outside of the sealing ring 30, which is pressed against the gasket retaining lip 11 and leading edge 21 of the adapter body 20, via venting channels 70 formed in the inner wall of the coupler body 10. The pressure can thereby escape the coupling through the openings in the sidewall of the coupling body in which the cam arms 41 or safety-release tabs 50 are secured. In this manner, the coupling assembly 1 is able to be safely vented upon disconnection of the adapter body 20 from the coupler body 10. For instance, see FIGS. 2H and 2I.

After venting has completed, the tabs 50 can be manually pressed and pivoted by hand to withdraw the working faces 51 of the tabs 50 out of engagement with the adapter body 20. Thus, the adapter body 20 may then be slid past the tabs 50 and fully removed from the coupler body 10.

The cam arms 41 may be located on the coupler body 10 closer to the base of the adapter-receiving socket than the safety-release tabs 50, and the cam arms 41 and the safety-release tabs 50 may be equally spaced apart circumferentially about the sidewall of the coupler body 10. In addition, each of the vent channels 70 may be provided in the form of a longitudinally extending groove formed an inner peripheral surface of the coupler body 10.

By way of example, and not by way of limitation, the coupler body 10 and adapter body 20 may be provided in 1½, 2, 3, and 4-inch sizes or greater and may be made of aluminum, brass, stainless steel, steel and steel alloys, iron, plastic or composite materials.

The foregoing description and specific embodiments are merely illustrative of the principles thereof, and various modifications and additions may be made to the apparatus by those skilled in the art, without departing from the spirit and scope of this invention.

We claim:

1. A coupler assembly, comprising:
    an adapter body having a sidewall extending between opposite ends and a circumferential groove in an outer periphery of the sidewall;
    a coupler body having a sidewall defining an adapter-receiving socket therein between opposite open ends;
    a sealing ring housed within the coupler body and captured between an end wall flange of the coupler body at a base of the adapter-receiving socket and a radially inward extending gasket retaining lip of the coupler body spaced from the end wall flange;
    at least one cam arm connected to the sidewall of the coupler body and able to pivot relative to the coupler body from an unlocking position in which a camming surface of the cam arm is pivoted out of the adapter-receiving socket and a locking position in which the camming surface of the cam arm is pivoted into the adapter-receiving socket through an opening in the sidewall of the coupler body for engagement with the circumferential groove of the adapter body for locking the adapter body within the coupler body in a condition in which a fluid-tight seal is formed by the sealing ring between the adapter body and the coupler body; and
    at least one safety-release tab connected to the sidewall of the coupler body such that the at least one safety-release tab is resiliently pivoted relative to the coupler body between a normal position that prevents release of the adapter body from the coupler body and a release position that permits release of the adapter body, and extends through a second opening in the sidewall of the coupler body, which second opening is circumferentially spaced apart from the opening for the at least one cam arm; from the coupler body;
    wherein at least one vent channel is formed in the sidewall of the coupler body within the adapter-receiving socket and extends from the end wall flange to beyond the gasket retaining lip of the coupler body adjacent an outer periphery of the sealing ring; and
    wherein the safety-release tab has a working face that extends within the circumferential groove of the adapter body but does not directly contact the adapter body when said adapter body is locked within the coupler body by the camming surface of the at least one cam arm and which engages an edge of the adapter body within the circumferential groove of the adapter body when the adapter body is no longer locked within the coupler body by the at least one cam arm.

2. The coupler assembly according to claim 1, wherein the at least one cam arm is located on the coupler body closer to the base of the adapter-receiving socket than the at least one safety-release tab.

3. The coupler assembly according to claim 1, wherein, when the working face of the safety-release tab engages the adapter body preventing release of the adapter body from the coupler body, a resting position of the adapter body within the coupler body provides open vent paths within the coupler assembly about the outer periphery of the sealing ring via the vent channels and through at least one of the openings in the sidewall of the coupler body.

4. The coupler assembly according to claim 1, wherein the safety-release tab has a sliding surface that extends within the adapter-receiving socket of the coupler body and that contacts a leading edge of the adapter body as the adapter body is inserted into the coupler body thereby pivoting the safety-release tab to a position outside the adapter-receiving socket of the coupler body to permit passage of the adapter body into the coupler body.

5. The coupler assembly according to claim 1, further comprising a spring adapted to exert a force between the coupler body and the at least one safety-release tab to resiliently force the at least one safety-release tab into the normal position in which the working face of the safety-release tab extends within the adapter-receiving socket of the coupler body.

6. The coupler assembly according to claim 5, wherein the spring is a torsion spring.

7. The coupler assembly according to claim 5, wherein the at least one safety-release tab has a part exterior of the adapter-receiving socket to which force can be applied to cause the at least one safety-release tab to pivot to the release position in which the working face of the at least one safety-release tab is caused to be withdrawn from the adapter-receiving socket to permit the adapter body to be released from the coupler body.

8. The coupler assembly according to claim 1, wherein the at least one cam arm is secured to the sidewall of the coupler body with a pivot pin extending between a pair of cam ears that extend outwardly from an outer periphery of the sidewall of the coupler body, and wherein the at least safety-release tab is secured to the sidewall of the coupler body with a pivot pin extending between a pair of tab ears that extend outwardly from an outer periphery of the sidewall of the coupler body.

9. The coupler assembly according to claim 1, wherein the at least one cam arm includes a pair of cam arms at opposed locations on the coupling body about the adapter-receiving socket.

10. The coupler assembly according to claim 9, wherein the at least one safety-release tab includes a pair of safety-release tabs at opposed locations on the coupling body about the adapter-receiving socket.

11. The coupler assembly according to claim 10, wherein the pair of cam arms and the pair of safety-release tabs are spaced apart circumferentially about the sidewall of the coupler body.

12. The coupler assembly according to claim 1, wherein a hose, pipe, conduit or vessel is connected to the coupler body adjacent the sealing ring and a separate hose, pipe, conduit or vessel is connected to a trailing end of the adapter body.

13. The coupler assembly according to claim 1, wherein the at least one vent channel is formed as a longitudinally extending groove formed in an inner peripheral surface of the coupler body.

* * * * *